United States Patent [19]

Overgaard et al.

[11] Patent Number: 5,051,205
[45] Date of Patent: Sep. 24, 1991

[54] PROCESS OF FORMING A STABLE COLLOIDAL DISPERSION

[75] Inventors: Thomas H. Overgaard, Redford Township, Wayne County; Gregory J. Cutting, Allen Park, both of Mich.

[73] Assignee: Atochem North America, Inc., Philadelphia, Pa.

[21] Appl. No.: 510,648

[22] Filed: Apr. 18, 1990

[51] Int. Cl.⁵ .............................................. B01J 13/00
[52] U.S. Cl. .................................... 252/314; 252/308
[58] Field of Search ................................ 252/308, 314

[56] References Cited

U.S. PATENT DOCUMENTS

| | | | |
|---|---|---|---|
| 4,430,251 | 2/1984 | Patterson et al. | 252/359 R |
| 4,439,405 | 3/1984 | Bailey et al. | 423/10 |
| 4,654,155 | 3/1987 | Kipp et al. | 252/32.5 |
| 4,776,966 | 10/1988 | Baker | 252/8.515 |

Primary Examiner—Robert L. Stoll
Assistant Examiner—Nina Bhat

[57] ABSTRACT

A method is disclosed to prepare a uniform, stable dispersion of an additive amount of a water-insoluble, high viscosity liquid polyalkylene glycol derivative in a substantially nonaqueous, water-soluble alkanolamine by combining under pressure a proportionate amount of the total polyglycol derivative to be added to the alkanolamine component, or mixture of alkanolamine and polyglycol derivative, subjecting the mixture to shear stress, and repeating the procedure until a uniform colloidal dispersion is obtained of the alkanolamine containing the desired additive amount of polyglycol derivative.

8 Claims, 1 Drawing Sheet

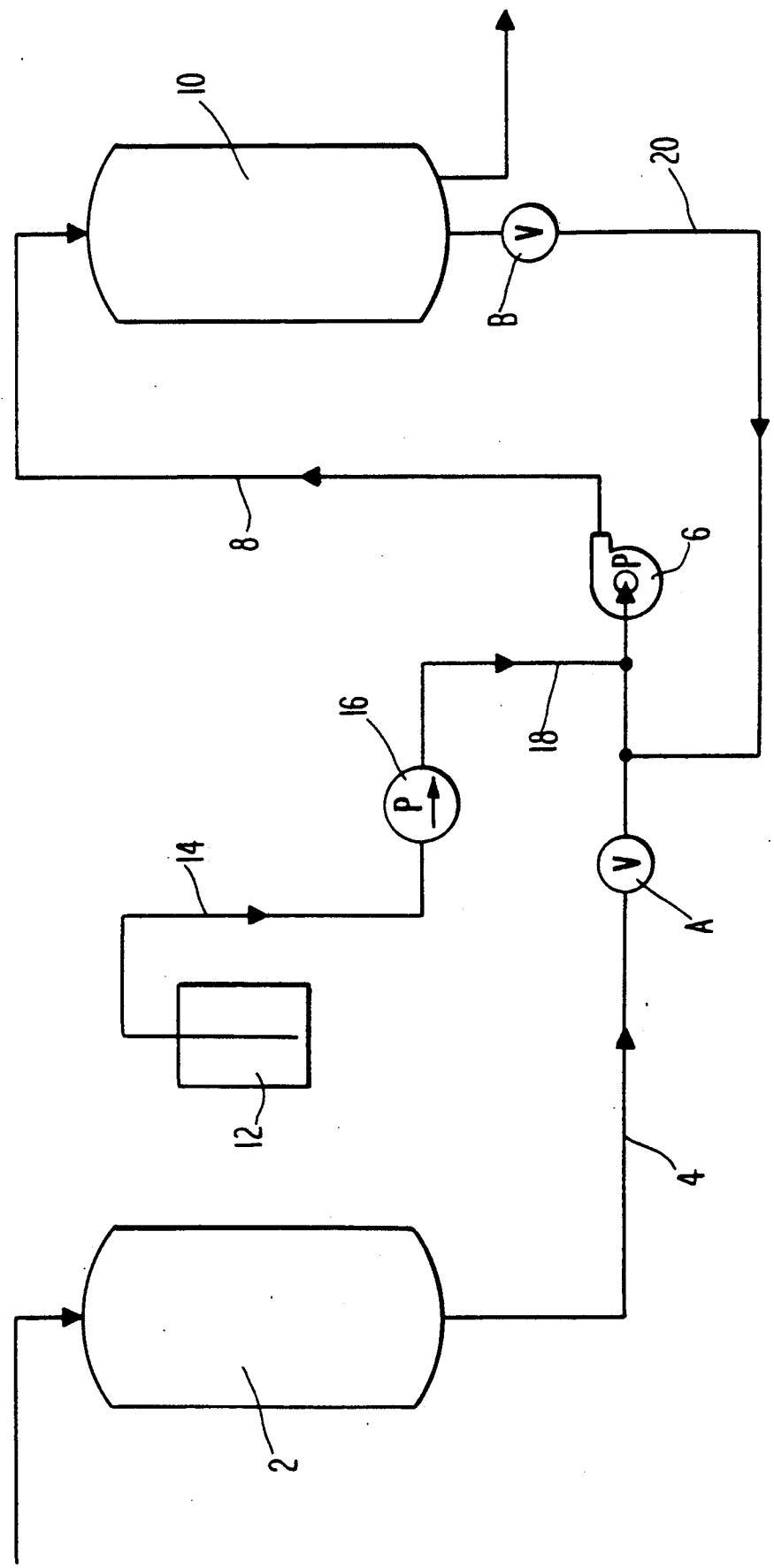

PROCESS OF FORMING A STABLE COLLOIDAL DISPERSION

BACKGROUND OF THE INVENTION

This invention concerns a process for combining liquid materials which are generally incompatible. More particularly, it concerns a process for combining, under pressure, a water-insoluble, liquid polyalkylene glycol derivative in relatively small amounts with a water-soluble, nonaqueous alkanolamine wherein the glycol derivative is repeatedly added under shear stress to the recycled alkanolamine in amounts proportionate to the total amount to be added until the desired colloidal dispersion is obtained.

The liquid materials to be combined in accordance with this process are not mutually soluble in any concentration. Because of the differences in polarity and molecular weight, they are not, under ordinary circumstances, even mutually miscible. Accordingly, to provide a stable, uniform colloidal dispersion, the components must be combined under strong mechanical forces. However, even at the low, additive amounts of the glycol derivative to be combined with the alkanolamine, a single pass at combining under pressure and applied shear stress the total amount of the derivative with the alkanolamine to obtain the desired dispersion has been unsuccessful. Repeated additions of proportionate amounts of the total amount of glycol derivative to be added to the alkanolamine must be made to provide a facile commercial process for preparing a stable dispersion of an alkanolamine containing the desired or additive amount of glycol or its derivative.

The dispersions of this invention are generally used in the gas treatment industry wherein recovered natural gas is sweetened by removal of hydrogen sulfide and/or carbon dioxide to reduce corrosiveness of the gas product. Alkanolamines and alkyl alkanolamines, are used as solvents in aqueous systems to absorb the acidic components of the gas. Occasionally, foaming develops in the aqueous alkanolamine system and anti-foam agents are added to overcome the problem. Polyalkylene glycols are widely used antifoam agents for alkanolamine sweeteners but attempts to combine the high viscosity, water-insoluble polyglycol derivatives with the nonaqueous alkanolamine at the formulator's plant have met with difficulties.

STATEMENT OF THE INVENTION

This invention is a process for uniformly dispersing an additive amount of a water-insoluble, liquid polyalkylene glycol derivative thereof having a viscosity (100° F.-SUS) of at least about 150, and preferably at least about 200, in a substantially nonaqueous, water-soluble alkanolamine, said process comprising feeding under pressure a first proportion of the total additive amount of said glycol derivative into a pressurized stream of said alkanolamine and subjecting the mixture to shear stress to form a first dispersion, recycling said first dispersion to the glycol derivative feed, feeding under pressure a second proportion of said glycol derivative into a pressurized stream of said first dispersion and subjecting the mixture to shear stress to form a second dispersion, optionally, recycling said second dispersion to said glycol derivative feed, and feeding another proportion of any remaining glycol derivative into a pressurized stream of said second dispersion and subjecting the mixture to shear stress to form a third dispersion, whereby a stable, colloidal dispersion of an additive amount of said glycol derivative is dispersed in said alkanolamine.

The Drawing

The sole figure of the drawing is a flow sheet of the process as it maybe used in a formulation plant showing tanks, pumps and flow lines for carrying out the process.

Detailed Description of the Invention

The process of this invention employs, as the additive to be uniformly dispersed into an alkanolamine, a water-insoluble, liquid polyalkylene glycol derivative having a viscosity (100° F.-SUS) of at least about 200. Preferably, the polyalkylene glycol derivatives have the following general formula:

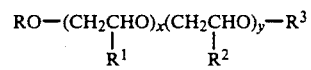

where R is $C_1$–$C_{25}$ alkyl or $C_6$–$C_{24}$ aryl, $R^1$, $R^2$ and $R^3$ are independently hydrogen or $C_1$–$C_{25}$ alkyl or $C_6$–$C_{24}$ aryl, and x and y independently have values of zero and higher provided that x or y is at least 1. Typical of such materials are polypropylene glycol monobutyl ether, polyethylene glycol monomethyl ether, poly (ethylene oxide - propylene oxide) monoethyl ether, poly (propylene oxide - butylene oxide) monooctyl ether, polypropylene glycol monomethyl ether, polybutylene glycol monophenyl ether, polypropylene glycol monomethylphenyl ether, polypropylene glycol monohexyl ether, polypropylene glycol diethyl ether and polyethylene glycol dimethyl ether.

The glycols or their derivatives are dispersed in the alkanolamine in an additive amount, preferably from about 0.01 to 2% based on the weight of the amine formulation. More preferably, an amount in the range of from 0.05 to 0.5% is used.

Examples of alkanolamines which are useful for this invention are monoethanolamine, diethanolamine, methylethanolamine, diisopropanolamine, ethylpropanolamine, methyldipropanolamine, methyldiethanolamine, ethyldiethanolamine, propyldiethanolamine, isopropyldiethanolamine, methyldiisopropanolamine, ethyldiisopropanolamine, propyldiisopropanolamine, diethylethanolamine, dimethylethanolamine, dipropylethanolamine, triethanolamine, and mixtures of the foregoing. The amines form the dispersant phase of the dispersion in non-aqueous form, ie, containing substantially no water.

Other additives and organic solvents may be incorporated into the alkanolamine-polyglycol derivative formulation, if desired.

The dispersions formed in the process of this invention may be recycled to receive proportionate amounts of the glycol derivative as many times as is necessary to complete the addition of the total additive amount and to obtain a uniform, stable dispersion.

Example

In the preferred embodiment of this invention, a 20,000 gallon batch of a formulation of methyldiethanolamine (MDEA) (99% minimum; 0.3% water maximum) having dispersed therein 0.1%, based on the weight of the formulation, of water-insoluble, polypropylene glycol monobutyl ether (avg. mol. wt=1040; viscosity=285 SUS at 100° F.), is prepared. Referring to the drawing, MDEA, from a 23,000 gallon capacity tank 2, is transferred under pressure through line 4, open valve A, pump 6 and line 8 into 23,000 gallon capacity holding tank 10. Valve B is kept closed during this phase of the operation.

Pump 6 is Model 3926 "ST" sold by Gould Pumps, Inc. having an impeller which rotates at 3500 r.p.m. and is powered by a 7.5 horsepower electric motor. The pump moves 52 gallons of amine per minute against a viscosity correct total head of 150 feet.

The polyglycol derivative is passed from drum 12 through line 14 by means of a positive pressure metering pump 16 (FMI RP650) supplied by Fluid Metering, Inc. of Oyster Bay, N.Y., and then through line 18. It is injected at the rate of 0.12 lbs./hour into the stream of MDEA flowing through line 4 by means of a tee in line 4 positioned six inches up stream from the suction flange of pump 6 The MDEA stream with the injected polyglycol derivative is passed into the vortex of the centrifugal pump 6 to subject the mixture to shear stress. At this rate, 173 lbs. of the glycol derivative is dispersed in 173,000 lbs of MDEA which provides a partial additive concentration of 0.0266 weight percent in the 6.4 hours required to transfer all of the 20,000 gallons of MDEA from tank 2 to tank 10. As the last of the MDEA passes the tee connecting line 18 to line 4, the metering pump 16 may be turned off. When the entire 20,000 gallon of MDEA has been transferred to tank 10, valve A is closed and valve B is opened to permit the MDEA and the partial amount of polyglycol derivative dispersed therein to recycle back through line 20 to line 4 through a tee disposed between valve A and the tee connecting line 18 to line 4. Metering pump 16 is restarted, or alternatively, if recycling is begun in sufficient time to provide a continuous flow of MDEA through line 4 as it approaches pump 6, metering pump 16 may run continuously until addition of the polyglycol derivative is finalized. To complete the addition of the polyglycol derivative to the MDEA, the contents of tank 10 are recycled 3.75 times as the polyglycol derivative is added at the controlled rate of 0.12 lbs/min. This provides a uniform, stable dispersion of 0.1% of polyglycol derivative in the MDEA, based on the weight of the formulation.

We claim:

1. A process for uniformly dispersing an additive amount of a water-insoluble, liquid polyalkylene glycol derivative having a viscosity (100° F. - SUS) of at least about 150 in a substantially nonaqueous, water-soluble alkanolamine, said process comprising feeding under pressure a first proportion of the total additive amount of the polyglycol derivative into a pressurized stream of said alkanolamine and subjecting the mixture to shear stress to form a first dispersion, recycling said first dispersion to the polyglycol derivative feed, feeding under pressure a second proportion of said polyglycol derivative into a pressurized stream of said first dispersion and subjecting the mixture to shear stress to form a second dispersion, whereby a stable, colloidal dispersion of an additive amount of said polyglycol derivative is uniformly dispersed in said alkanolamine.

2. The process of claim 1 wherein at least said first dispersion is stored in a holding tank until said first dispersion is completely formed.

3. The process of claim 1 wherein the dispersion is recycled at least three times to provide a final dispersion containing the total additive amount of said polyglycol derivative.

4. The process of claim 1 wherein said polyglycol derivative has the following general formula:

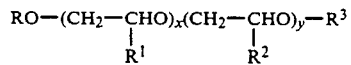

where R is $C_1$-$C_{25}$ alkyl or $C_6$-$C_{24}$ aryl, $R_1$, $R_2$ and $R_3$ are independently hydrogen, $C_1$-$C_{25}$ alkyl or $C_6$-$C_{24}$ aryl and x and y independently have values of zero and higher provided that either x or y is at least 1.

5. The process of claim 4 wherein said alkanolamine is methyldiethanolamine.

6. The process of claim 5 wherein said polyglycol derivative is polypropylene glycol monobutylether dispersed in said alkanolamine in a total amount ranging from about 0.01 to about 2% based on the combined weight of the alkanolamine and the polyglycol derivative.

7. The process of claim 1 wherein the shear stress is produced by passing the mixture into the vortex of a centrifugal pump.

8. The process of claim 7 wherein the polyglycol derivative is polypropylene glycol monobutyl ether in an amount ranging from 0.05 to 0.5% based on the combined weight of the alkanolamine and the polyglycol derivative, and the alkanolamine is methyldiethanolamine.

* * * * *